United States Patent
Schwimmer

[11] Patent Number: 5,931,361
[45] Date of Patent: Aug. 3, 1999

[54] BICYCLE RACK/BAG ASSEMBLY

[76] Inventor: Charles Martin Schwimmer, 1820 Gunston Way, San Jose, Calif. 95124

[21] Appl. No.: 08/714,452

[22] Filed: Sep. 16, 1996

[51] Int. Cl.$^6$ ........................................................ B62J 7/04
[52] U.S. Cl. ........................... 224/453; 224/427; 224/431; 224/435; 224/448; 224/455; 224/418
[58] Field of Search ...................................... 224/430, 431, 224/433, 435, 437, 438, 439, 443, 448, 453, 452, 454, 455, 456, 418

[56]  References Cited

U.S. PATENT DOCUMENTS

| | | | |
|---|---|---|---|
| 2,229,756 | 1/1941 | McCann et al. | 224/431 |
| 3,874,574 | 4/1975 | Heise | 224/430 |
| 4,266,703 | 5/1981 | Litz | 224/443 |
| 4,440,331 | 4/1984 | Schimmels | 224/431 |
| 5,322,311 | 6/1994 | Dunn | 224/427 |
| 5,332,134 | 7/1994 | Chen | 224/427 |
| 5,395,017 | 3/1995 | Naughton | 224/427 |
| 5,649,657 | 7/1997 | Chuang | 224/430 |

FOREIGN PATENT DOCUMENTS

| | | | |
|---|---|---|---|
| 2681039 | 3/1993 | France | 224/39 |
| 3513878 | 4/1986 | Germany | 224/32 A |
| 75753 | 10/1949 | Norway | 224/39 |

*Primary Examiner*—Linda J. Sholl
*Attorney, Agent, or Firm*—Kajane McManus

[57]  ABSTRACT

The bicycle rack/bag assembly comprises a rack which depends from a seat post over a rear wheel of a bicycle. A plurality of accessories, such as a pack or bag, a drawer, and a mud flap may be engaged to the rack, each individually, or in any desired combination. The rack includes a quick connect/release assembly for easily engaging the rack to a seat post of substantially any diameter.

25 Claims, 3 Drawing Sheets

BICYCLE RACK/BAG ASSEMBLY

BACKGROUND OF THE INVENTION

1. Field of the Invention

The present invention relates to a multi-unit bicycle rack/bag assembly, the units of which can be combined in a plurality of configurations. More specifically, the rack depends from a seat post of a bicycle is quickly and releasably engaged thereto in one of at least two available positions, and may have a drawer, a mud flap, a rack bag or pack, or any combination thereof, engaged thereto. Further, a C-shaped bicycle lock may be carried on the rack for use as desired.

2. Prior Art

Heretofore various bicycle rack structures which are positioned over a rear tire of a bicycle have been proposed, some of which depend from a seat post of the bicycle. Such racks typically do not accommodate, quick release and engagement to the bicycle seat post from which they depend without requiring removal of the seat post. The racks also do not offer a multi-unit combination accessory system by means of which desired accessories can be engaged thereto, singularly, or in a chosen combination.

SUMMARY OF THE INVENTION

Accordingly, it is a primary object of the invention to provide a bicycle rack which is quickly and releasably engaged to a bicycle seat post from which it depends to lie over a rear tire or wheel of the bicycle.

It is a further object of the invention to provide multiple accessories which can be releasably engaged to the rack, alone or in any desired combination thereof.

It is yet a further object to provide a rack to which accessories as presently configured may be attached as well.

DESCRIPTION OF THE PREFERRED EMBODIMENT

Figure 1:
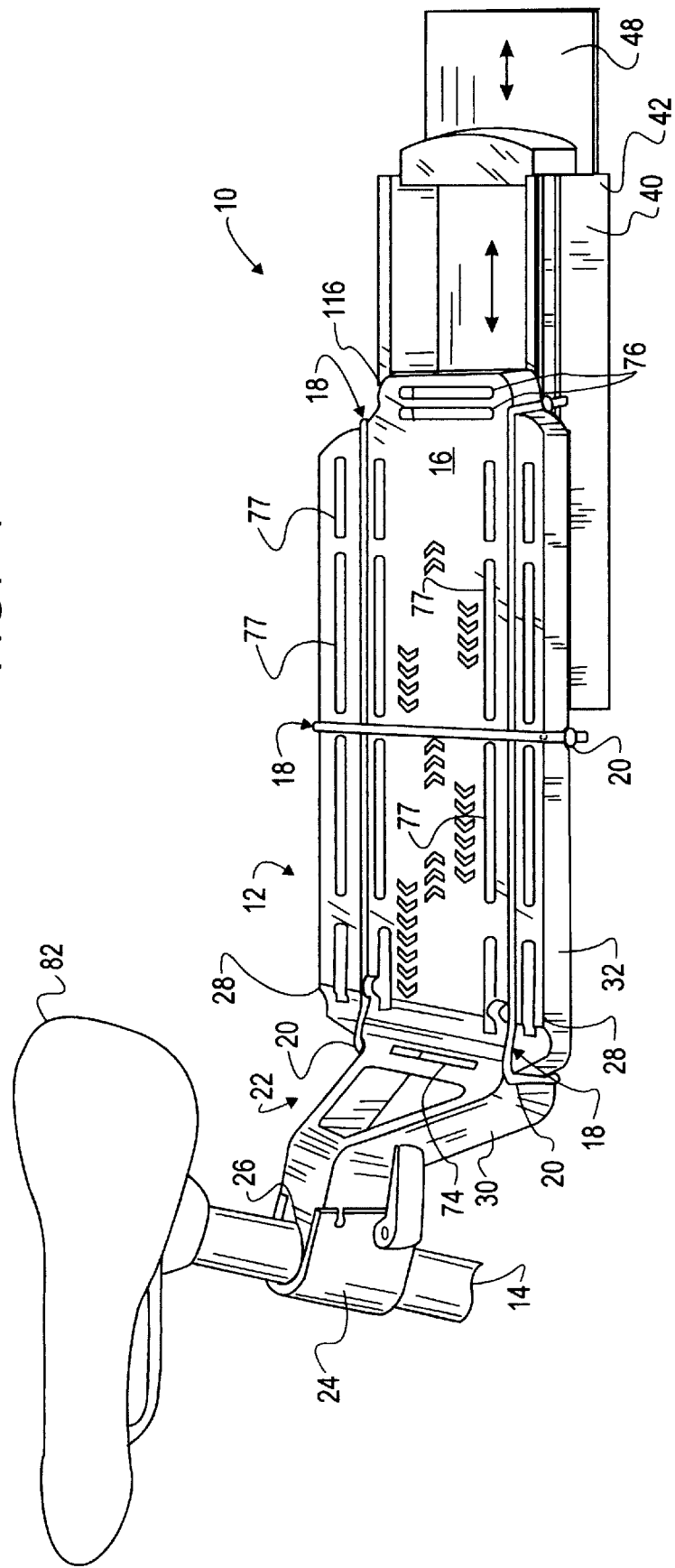
FIG. 1 is a perspective view of a bicycle rack made in accordance with the teachings of the present invention shown mounted to a bicycle seat post and having both an accessory drawer and an accessory mud flap engaged thereto.

Referring now to the drawings in greater detail, there is illustrated therein the bicycle rack/bag (pack) assembly made in accordance with the teachings of the present invention and generally identified by reference numeral 10.

The primary component of the assembly 10 is a bicycle rack 12 which is designed to be suspended from a bicycle seat post 14 and to extend rearwardly therefrom over a rear wheel (not shown) of a bicycle (not shown).

An upper surface 16 of the rack 12 may be textured to enhance friction thereagainst and includes a plurality of intersecting channels 18 therein within which elastic straps 20 rest when not being used to engage various desired non-assembly items to the rack 12, in known manner.

The rack 12 is seen to be a planar member 12 having an upwardly forwardly stepped tongue 22 which is engaged by a clip 24, the clip 24 engaging about the seat post 14 and securing same within and against a cooperatively configured free end 26 of the tongue 22. The tongue 22 is seen to be Y shaped, forking laterally outwardly toward side edges 28 of the rack 12 along the area thereof defining the forwardly and upwardly extending step 30.

Figure 4:
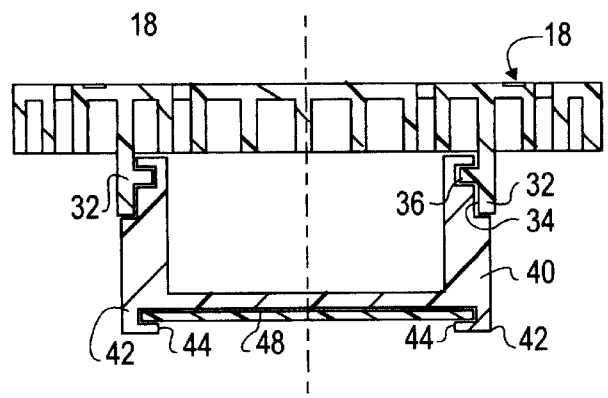
FIG. 4 is a cross sectional view through the assembly of FIG. 1 showing the engagement structure for there drawer and/or the mud flap.

Each side edge 28 of the rack 12 includes a depending flange 32 along an interior surface 34 of which a horizontal track 36 (FIG. 4) is defined.

The cooperating pair of tracks 36 thus created is used to engage cooperating structure provided on each of two accessories. The first accessory seen is a drawer 40 which is slidingly engaged to and within the pair of flange tracks 36. The drawer 40 itself has a pair of side flanges 42 which also defines a further pair of tracks 36, the tracks of the drawer 40 being identically spaced apart as are the tracks 44 of the rack 12.

Figure 5:
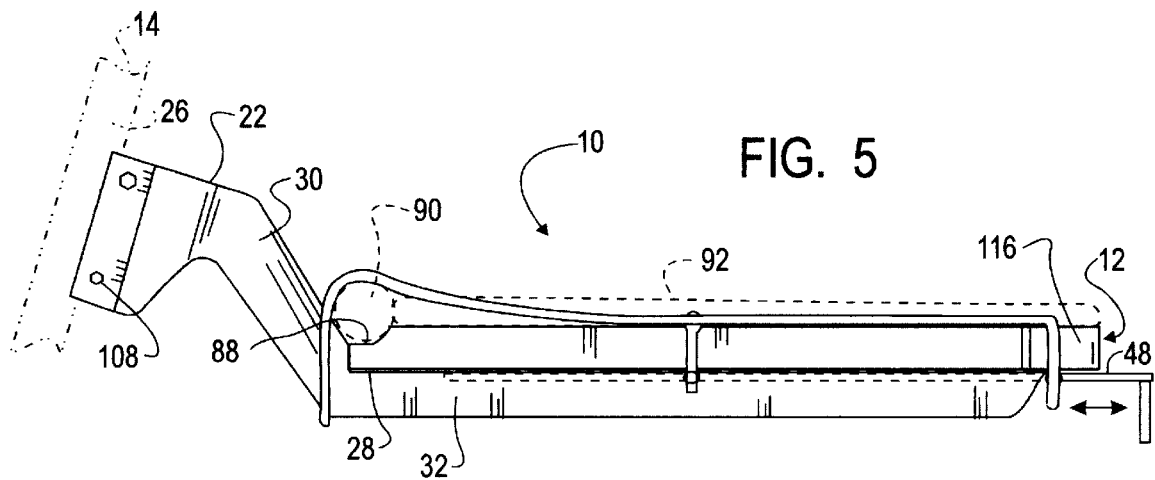
FIG. 5 is a side view of the rack showing only a mud flap engaged thereto and showing the rack carrying a common bicycle lock.

Within either identical set of tracks 36 or 44 there can be slidingly engaged a further accessory seen to comprise a mud flap 48. In FIG. 5, the drawer 40 has been left off and the mud flap 48 alone is shown directly engaged to the rack tracks 36.

Before continuing, it must be understood that, although not shown, the rack 12 may, if desired, be used as a stand alone unit, as well as being capable of securely engaging any combination of presently proposed accessories as defined herein. It must also be understood that accessories other than those defined herein may be created in a manner to be engageable to the rack 12 as presently disclosed. Thus, the examples set forth herein should not be construed as limiting.

Figure 2:
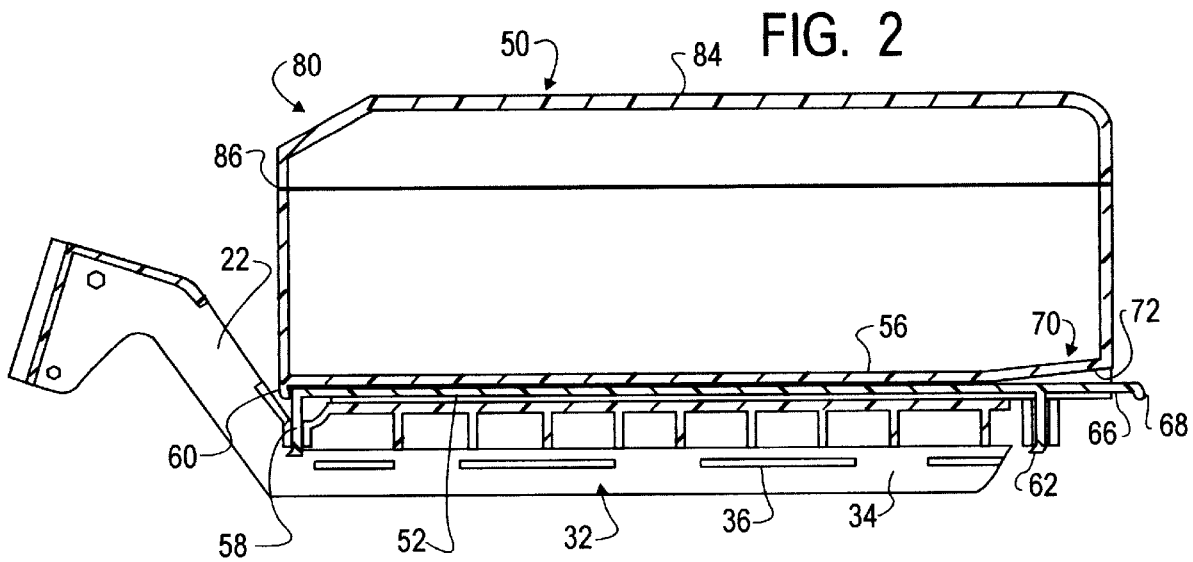
FIG. 2 is a side view of the rack of FIG. 1 showing an accessory rack pack or bag mounted to a top surface thereof by a releasable latching plate.
Figure 3:
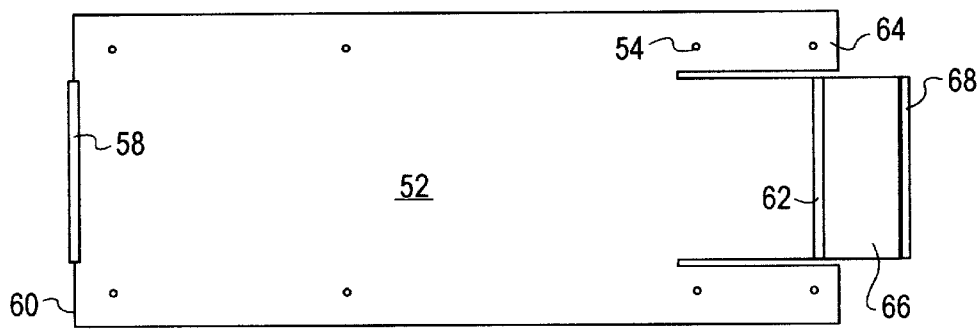
FIG. 3 is a bottom plan view of the latching plate.

Turning now to FIG. 2, there is shown therein a further accessory, in the form of a bag or pack 50, engaged to the rack 12 in a manner to extend upwardly therefrom. Presently available packs or bags are secured to a bicycle rack by self-engaging straps provided on the bags with the straps 20 only coming into play for securing miscellaneous otherwise non-securable items to the rack 12.

To create a more secure bag 50 engagement in a manner which does not require use of straps which allow the bag to shift about, the assembly 10 includes a snap-fit type latching plate 52. The latching plate 52 is a planar rectangular element having, in this embodiment, a plurality of holes 54 drilled therethrough, the holes 54 accommodating connectors (not shown) which pass through a floor 56 of the pack 50 to fix the plate 52 to the pack 50, in predetermined relative orientation. The plate 52 has one fixed in place depending locking tab 58 extending downwardly from a front end edge 60 thereof and further includes a second locking tab 62 extending downwardly along a rear end edge 64 thereof, the second locking tab 62 being based upon a flexible flap 66 cut into the plate, the flap 66 extending rearwardly of the rear end edge 64 and including grab tab 68 thereon.

A portion 70 of the bag floor 56 overlying the flap 66 is provided with a upwardly sloped cutaway 72 into which the flap 66 can be flexed to create a release mechanism for the locking tab 62 mounted on the flap.

Once the flap mounted locking tab 62 is released by flexing the flap 66 upwardly, the other locking tab 58 is easily disengaged.

With respect to engagement of the tabs 58 and 62, referring back to FIG. 1, it will be seen that a forward cross slot 74 and two rear cross slots 76 are provided in the rack 12, and it is into respective ones of these that the locking tabs 58 and 62, respectively, drop and snap into engagement.

The particular pack or bag 50 illustrated herein is preferably made of a firm, semirigid material which holds its shape. Alternatively, there is nothing precluding use of a soft sided pack (not shown) in place thereof, with bags having self-securing straps thereon being accommodated for engagement by the provision of the cross slots 74 and 76 and/or side slots 77, through which strap sections may be fed. A forward end 80 of the pack 50 shown herein is chamfered, to allow clearance for a bicycle seat rear end 82, with the bag 50 having a top 84 which rotates forwardly and up about a forward end hinge 86.

In FIG. 5, the rack 12 is shown to have only the mud flap 48 engaged thereto. Further, in this view a forward cross channel 88 at a point of juncture between the rack 12 and the rack tongue 22 becomes apparent, the channel 88 accommodating a cross piece 90 of a C-shaped bicycle lock 92 to carry the lock 92 (shown in phantom).

For producing engagement or disengagement between the tongue 22 and the clip 24, upward pivoting of a rear end 116 of the rack 12 is required.

Figure 6:
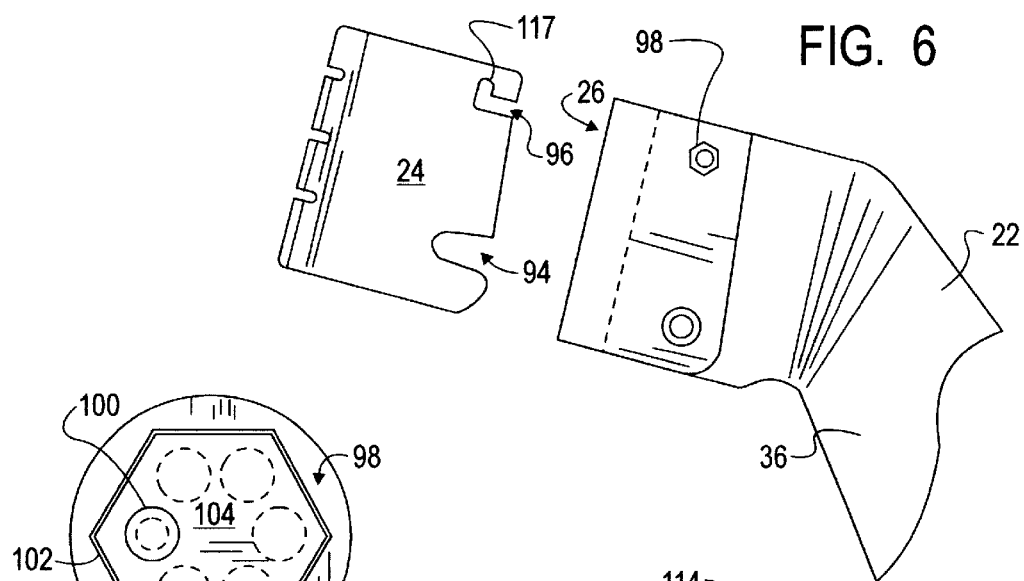
FIG. 6 is an enlarged side view of a quick connect system including a releasable engaging clip for connecting a tongue at the forward end of the rack to a bicycle seat post.

The need for such pivotability is best illustrated in FIG. 6. Here the clip 24 is seen to include a pair of straight lower or bottom slots 94 and a pair of L-shaped upper or top slots 96.

The rack tongue 22 is seen to include an upper connector 98 comprising a hexagonal pin 98 having a nub 100 (FIG. 7) at an identical corner 102 thereof, on each end 104 of the pin 98, the pin 98 being slidingly engaged within a throughbore (not shown) in the tongue 22, and being rotated to place the end nubs 100 at a selected one of six available positions (shown in phantom, FIG. 7) for accommodating engagement of the nubs 100 within a blind pouch 117 of each L-shaped slot 96 regardless of seat post 14 diameter. The bottom slot 94 on the clip 24 engages over end portions 104 of a skewer 106 which extends through a bottom throughbore 108 of the tongue 22 and is fixed in position at one end 104 by a nut or end cap 110 and an eccentric quick release lever 112 at the other end 104. When the lever 112 is set to a position where a pivot point 114 thereof is furthest out, the clip 24 is "locked" on by friction and when the pivot point 114 is closest in, the friction is decreased so the clip 24 can be disengaged from its bottom-slot-over-skewer position. The eccentric pivot point 114 is positioned so that the lever 112 lies against the clip 24 when locked and is pivoted out to provide release.

Figure 8:
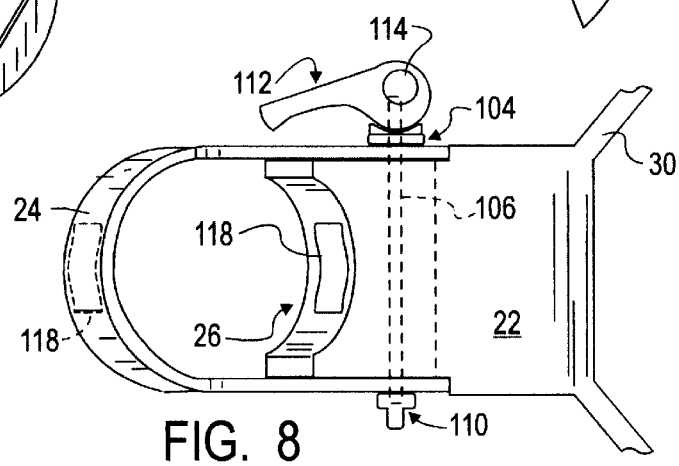
FIG. 8 is a perspective top view of the quick connect system showing an eccentric toggle latch used for releasing clip engagement.

During engagement, the clip 24 is positioned about the seat post 14, the lever arm 112 on the tongue 22 is pivoted outwardly, and the rear end 16 of the rack is raised above the tongue 22. The nubs 100 on the pin 98 are, then slid into the top slots 96 simultaneously until positioned below the upwardly extending blind end pouch 117 thereof. Then, as the rear end 116 of the rack 12 is pivoted downwardly just past horizontal, the quick release skewer 106 is positioned to slide into the bottom slots 94 and the nubs 100 are shifted upwardly into the end pouches 117 of the upper slots 96. The lever arm 112 is then brought toward the clip 24, locking the clip 24 and tongue 22 together as best shown in FIG. 8. If desired, optional friction pads 118 may be provided on seat post 14 engaging surfaces of the clip 24 and tongue 22, as illustrated.

Figure 7:
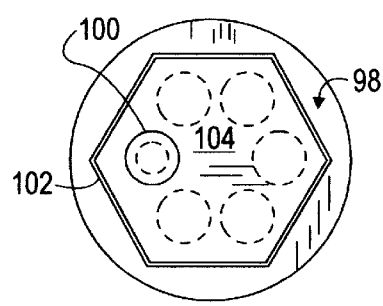
FIG. 7 is an enlarged end view of one embodiment of a rotatable pin used to provide a desired relative position between the forward end of the rack and the engaging clip to accommodate various seat post diameters.

To accommodate various seat post diameters, the pin 98 as best shown in FIG. 7 is configured as a hexagon which provides for a plurality of possible orientations for the end nubs 100, to ease engagement and release as much as possible, while accommodating a plurality of possible seat post diameters. Alternatively, the clip 24 could be configured to accommodate the greatest seat post diameter and shims could be provided for insertion into the clip 24 and/or against the seat post 14 engaging free end surface 26 of the tongue 24 for seat posts of lesser diameter.

It will be understood that the forwardly stepped tongue 22 is provided to create a lowered center of gravity for the assembly 10, with the rack 12 only being elevated above the rear bicycle wheel enough to allow for clearance for any accessories depending from the rack 12.

As described above, the bicycle rack/bag assembly 10 of the present invention provides a number of advantages some of which have been described above and others of which are inherent in the invention. Also modifications can be proposed to the assembly 10 without departing from the teachings herein. Accordingly, the scope of the invention is only to be limited as necessitated by the accompanying claims.

I claim:

1. A rack assembly for a bicycle having a seat post, said rack assembly comprising a planar rigid rack depending solely from the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position.

2. The rack assembly of claim 1 wherein said rack includes depending side flanges each of which has an inner surface including a cooperating track thereon.

3. The rack assembly of claim 1 further including a planar mud flap which is engageable within the rack tracks.

4. The rack assembly of claim 1 further including a drawer which is engageable within the, rack tracks.

5. The rack assembly of claim 4 wherein said drawer includes side flanges each of which has an inner surface including a cooperating track thereon.

6. The rack assembly of claim 5 further including a planar mud flap which is engageable within the drawer tracks.

7. The rack assembly of claim 1 further including a rack pack engageable to said rack.

8. The rack assembly of claim 7 wherein said rack pack is made of a semirigid material.

9. The rack assembly of claim 8 wherein said rack pack has a floor which is fixed to a planar releasable rack engaging latch plate.

10. The rack assembly of claim 9 wherein said latch plate includes latching structure depending therefrom which aligns with and engages cooperating structure on said rack.

11. The rack assembly of claim 10 wherein said rack includes at least one cross slot along a front edge thereof and at least one cross slot along a rear edge thereof.

12. The rack assembly of claim 10 wherein said latching structure comprises a pair of depending flanges, each of which engages a cooperating cross slot formed in the rack.

13. The rack assembly of claim 12 wherein one depending flange is mounted on a moveable flap created at and extending past one end of the plate.

14. The rack assembly of claim 13 wherein said rack pack includes an upwardly sloped cutaway at one end of the floor thereof, the moveable flap flexing upwardly into said cutaway to release engagement between the depending flange mounted thereon and the rack cross slot to which the flange is engaged in a snap-fit manner.

15. The rack assembly of claim 1 wherein said tongue is forwardly and upwardly stepped.

16. In combination with a rack assembly for a bicycle having a seat post, said rack assembly comprising at least a planar rigid quick release rack depending solely from the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position, a narrow, elongate planar member which serves as a mud flap which is slidably engaged to cooperating engaging structure of said rack.

17. In combination with a rack assembly for a bicycle having a seat post, said rack assembly comprising at least a planar rigid quick release rack depending solely from the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position, a narrow, elongate drawer which is slidably engaged to and depends from cooperating engaging structure of said rack.

18. In combination with a rack assembly for a bicycle having a seat post, said rack assembly comprising at least a planar rigid quick release rack depending solely from of the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position, a rack pack having a rack engaging latch plate mounted to an undersurface thereof, said latch plate mechanically engaging said pack to cooperating structure on said rack.

19. In combination with a rack assembly for a bicycle having a seat post, said rack assembly comprising at least a planar rigid quick release rack depending solely from the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position, a narrow, elongate drawer which is slidably engaged to and depends from cooperating engaging structure of said rack and, a narrow, elongate planar mud flap which is mechanically engaged to cooperating engaging structure depending from an underside of said drawer.

20. In combination with a rack assembly for a bicycle having a seat post, said rack assembly comprising at least a planar rigid quick release rack depending solely from the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position, a rack pack having a rack engaging latch plate mounted to a floor thereof, said latch plate mechanically engaging said pack to said rack, and a narrow, elongate planar mud flap which is mechanically engaged to cooperating engaging structure of said rack.

21. In combination with a rack assembly for a bicycle having a seat post, said rack assembly comprising at least a planar rigid quick release rack depending solely from the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position, a narrow, elongate drawer which is slidably engaged to and depends from cooperating engaging structure of said rack, and a rack pack having a rack engaging latch plate mounted to a floor thereof, said latch plate mechanically engaging said pack to cooperating structure on said rack.

22. In combination with a rack assembly for a bicycle having a seat post, said rack assembly comprising at least a planar rigid quick release rack depending solely from of the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position, a narrow, elongate drawer which is slidably engaged to and depends from cooperating engaging structure of said rack, a narrow, elongate planar mud flap which is mechanically engaged to cooperating structure depending from an underside of said drawer, and a latch plate engaged to a floor of a pack for mechanically engaging said pack to said rack.

23. In combination with a rack assembly for a bicycle having a seat post, said rack assembly comprising at least a planar rigid quick release rack depending solely from the seat post of the bicycle by a tongue and a clip and extending horizontally rearwardly thereof, the rack including said tongue which engages said quickly releasable seat post engaging clip at a free end thereof with the rack further including structure thereon for releasably engaging an accessory to be carried thereby, said clip having at least one pair of slots, said tongue and clip being connected together around the seat post with said slots mechanically engaging cooperating structure on said tongue, and a lever operatively connected to said tongue and having an eccentric pivot point, the lever frictionally locking the clip slots in place about the cooperating tongue structure when the pivot point is at a furthest out position and releasing frictional locking when at a closest in position, and having a plurality of cross slots therein, a latching plate engageable to an underside of an accessory which rises from the rack, said latching plate including a plurality of depending rack engaging members which engage said latch plate and accessory attached thereto to the rack cross slots in a releasable snap-fit manner.

24. A rack assembly for a bicycle having a seat post, said rack assembly comprising a planar rigid rack depending solely from the seat post of the bicycle by a tongue and a clip, said clip having at least one pair of slots, said tongue and said clip being connected together around the seat post with said slots mechanically engaging cooperating structure on said tongue and a lever operatively connected to said tongue and having an eccentric pivot point, the lever frictionally locking the clip slots in place about the cooperating tongue structure when the pivot point is at a furthest out position and releasing frictional locking when at a closest in position.

25. The rack assembly of claim 24 wherein said slots of said clip and said cooperating structure on said rack tongue are relatively positionable to accommodate any seat post diameter.

\* \* \* \* \*